UNITED STATES PATENT OFFICE.

EDUARD RAUPPACH AND LEOPOLD BERGEL, OF GAUCHTL, AUSTRIA-HUNGARY.

PROCESS OF MAKING GLUE.

SPECIFICATION forming part of Letters Patent No. 500,428, dated June 27, 1893.

Application filed January 23, 1892. Serial No. 418,992. (No specimens.)

*To all whom it may concern:*

Be it known that we, EDUARD RAUPPACH and LEOPOLD BERGEL, subjects of the Emperor of Austria-Hungary, residing in Gauchtl, Province of Moravia, in the Empire of Austria-Hungary, have invented certain new and useful Improvements in a new Process of Making Glue and its Appliances; and we do hereby declare the following to be a full, clear, and exact description of the invention, such as will enable others skilled in the art to which it appertains to make and use the same.

Our invention relates to certain improvements in the manufacture of glue for cementing together wooden or other surfaces and its object is to provide an economical and efficient process of making such glue all as will be hereinafter fully set forth.

It is a known fact that curds mixed with lime give a good cement or binding material, but it has not come into extended practical use as a glue, for the reason that the paste, when made up, hardens in a short time and becomes practically worthless as a glue. Another inconvenience of the ordinary caseine-glue, as well as of the ordinary bone-glue is, that the glued surfaces require a long time (four to six hours) for drying, thus causing a delay in the work.

The object of our present invention is to obtain a good liquid glue, by means of which the union of surfaces can be effected almost instantaneously, forming a joint possessing great resistance to the action of heat and moisture.

In carrying out our improved process, we make up a thick paste in a kettle, by mixing a hundred pounds of ordinary curds with about thirty quarts of water which parts we heat to about 104° Fahrenheit; then we add ammonia of any concentration, while stirring the mass, in such a quantity and for such length of time, as to completely precipitate the caseine. Thus practically pure caseine and whey are obtained, which latter is separated from the caseine by drawing it off, by pressing it out, or by treatment in the ordinary centrifugal apparatus. The caseine is then washed out by spreading it over straining cloths, stretched over suitable frames, and by pouring water over it. The resulting caseine, being free of whey, is now mixed in a kettle with about eight or ten pounds, of commercial aqua ammonia, and the mixture is heated to 90° to 110° Fahrenheit thereby changing it into a liquid glue which may be preserved by the addition of water (about forty quarts to one hundred pounds glue) or by the addition of suitable preservatives. In order to effect a quick union of surfaces with this new glue, the surfaces are coated with the same by means of a brush and the coating is allowed to dry. Thus quite a number of wood pieces may be prepared in advance. These surfaces, thus prepared with the coating of ammonia glue, are then coated with ordinary milk of lime or with a thin paste of lime applied with a brush. The pieces are then brought together and pressed against each other in the ordinary way. The calcium of the lime-milk or the paste of lime in the joint, combines with the caseine in the glue, setting free at the same time the ammonia. The compound of calcium and caseine thus produced binds the surfaces so solidly together, that after five minutes the work piece may be handled again in its further process of manufacture.

Finally it may be remarked, that in the above described process the ammonia may be substituted by caustic potash, caustic soda or any other alkali though the resulting glue would have less resistance to moisture on account of the affinity of such soda or potash for water.

Having thus described our invention, what we desire to secure by Letters Patent is—

1. The herein described process of manufacturing glue which consists in first heating a mixture of curds and water to a temperature of about 104° Fahrenheit then adding an alkali whereby the caseine is precipitated and then separating said caseine, substantially as set forth.

2. The herein described method of manufacturing glue, which consists in first heating a mixture of curds and water to a temperature of about 104° Fahrenheit then adding an alkali whereby the caseine is precipitated, then separating said caseine and then heating said caseine with an alkaline solution to a temperature of from 90° to 110° Fahrenheit, substantially as set forth.

In witness whereof we have hereunto signed our names in the presence of two subscribing witnesses.

EDUARD RAUPPACH.
LEOPOLD BERGEL.

Witnesses:
W. B. MURPHY,
C. FROMAWICZ.